Dec. 9, 1924.  1,518,324
A. A. HEATON, JR
TOY ELECTRIC TRACTOR
Filed March 7, 1923
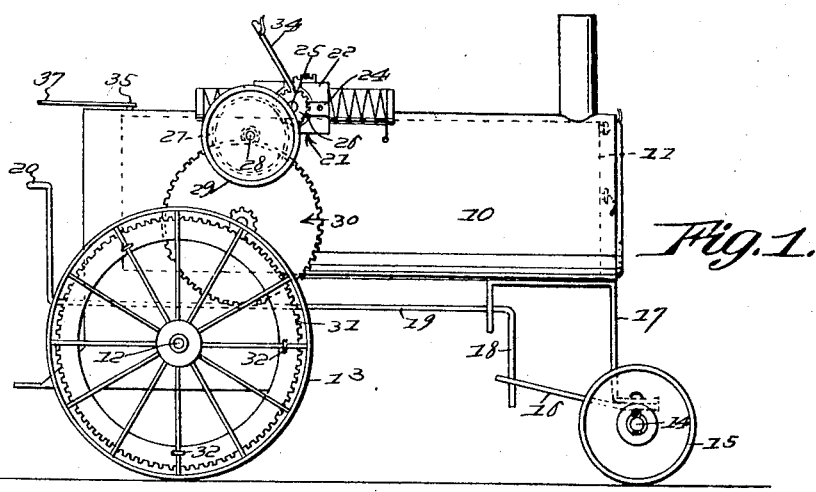
Fig. 1.
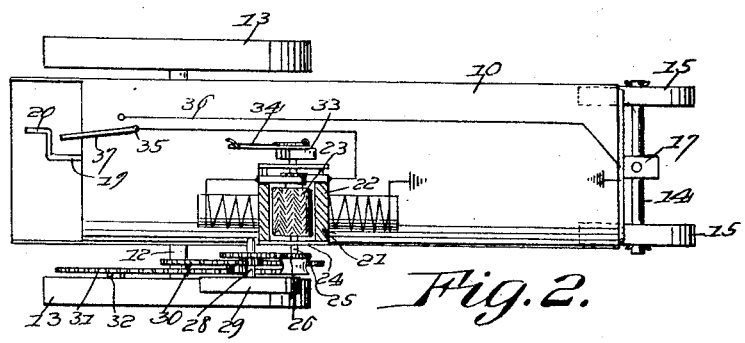
Fig. 2.
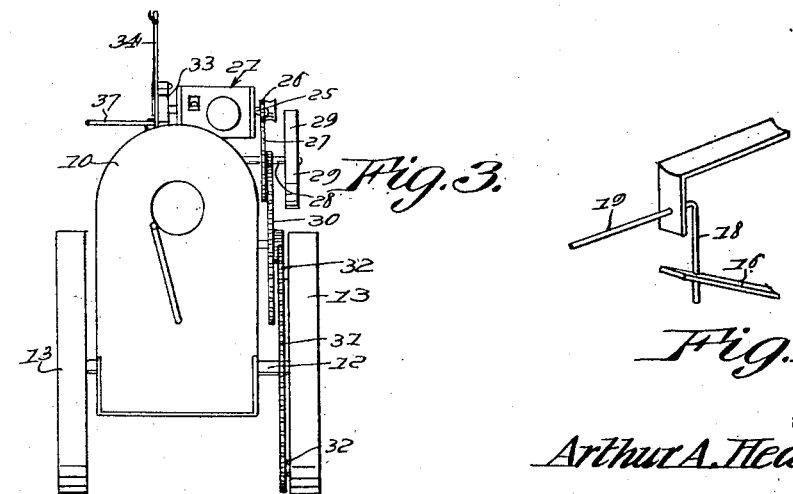
Fig. 3.
Fig. 4.
Inventor,
Arthur A. Heaton, Jr.
By
Attorney Patented Dec. 9, 1924.

1,518,324

UNITED STATES PATENT OFFICE.

ARTHUR A. HEATON, JR., OF PERTH, NORTH DAKOTA.

TOY ELECTRIC TRACTOR.

Application filed March 7, 1923. Serial No. 623,450.

*To all whom it may concern:*

Be it known that ARTHUR A. HEATON, Jr., a citizen of the United States of America, residing at Perth, in the county of Towner and State of North Dakota, has invented new and useful Improvements in Toy Electric Tractors, of which the following is a specification.

The object of the invention is to provide an attractive toy having the general appearance and characteristics in operation of a tractor and which may be manufactured at a relatively small cost and may be manufactured in an operative condition by the replacement from time to time of a dry cell battery of commercial form; and with this object in view the invention consists in a construction and combination of parts of which a preferred embodiment is shown in the accompanying drawings, wherein:—

Figure 1 is a side view, and

Figure 2 is a plan view of a device embodying the invention.

Figure 3 is a rear view of the same.

Figure 4 is a view of the steering mechanism.

The device consists essentially of a horizontally disposed cylindrical drum or body 10 constituting a housing for the removable battery 11 of the dry cell type, said body being supported at its rear end by an axle 12 having the traction wheels 13 and at its front end by a front or steering axle 14 having the steering wheels 15, said front axle having a rearwardly extended tongue 16 pivotally mounted in a bracket 17 depending from the body 10 and engaged by a crank arm 18 at the front end of a steering bar 19 which extending to the rear end of the body is provided with a suitable operating handle 20.

The motor 21 having the field magnet 22 and armature 23 is mounted in a bracket 24 supported by the cylindrical body of the device and the spindle 25 of the armature at one end carries a pinion 26 meshing with a gear 27 which communicates motion to the spindle 28 of a fly wheel 29 which in turn is connected by a train of speed reducing gearing 30 with a drive gear 31 revolubly mounted on the rear axle of the vehicle and provided with an ear 32 engaging a spoke of one of the traction wheels so as to communicate rotary motion thereto. At its other end the spindle 25 of the armature may, as illustrated be provided with a brake drum 33 for control by a brake lever 34 and a switch 35 intercepting the conductor 36 between the motor and the battery is provided with an operating lever 37 which may be set to either open or close the circuit.

Due to the train of speed reducing gearing it will be obvious that the speed of movement of the device may be regulated to closely resemble the movements of a commercial tractor and thereby through the possibility of hauling other objects or vehicles may afford amusement and entertainment to the juvenile operator.

Having described the invention, what is claimed as new and useful is:—

A toy simulating a steam tractor comprising a wheel-mounted frame, a battery mounted upon the frame in semblance of the boiler of the tractor, a motor mounted upon the battery and electrically connected therewith, a brake mechanism mounted upon the battery and adapted to control the rotation of the rotor of the motor, and a train of gear wheels operatively connecting the shaft of the motor with one of the supporting wheels of the frame.

In testimony whereof he affixes his signature.

ARTHUR A. HEATON, JR.